US007785189B2

(12) United States Patent
Brosnan et al.

(10) Patent No.: US 7,785,189 B2
(45) **Date of Patent: *Aug. 31, 2010**

(54) CENTRAL DETERMINATION GAMING SYSTEM WHICH PROVIDES A PLAYER A CHOICE IN OUTCOMES

(75) Inventors: William R. Brosnan, Reno, NV (US); Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 762 days.

This patent is subject to a terminal disclaimer.

(21) Appl. No.: 11/687,335

(22) Filed: Mar. 16, 2007

(65) Prior Publication Data

US 2007/0155480 A1 Jul. 5, 2007

Related U.S. Application Data

(63) Continuation of application No. 10/442,318, filed on May 20, 2003, now Pat. No. 7,192,348.

(51) Int. Cl.
*A63F 9/24* (2006.01)
*A63F 13/00* (2006.01)

(52) U.S. Cl. ............................ 463/20; 463/16; 463/21; 463/42

(58) Field of Classification Search ............ 463/16–21, 463/26, 42, 43; 273/139
See application file for complete search history.

(56) References Cited

U.S. PATENT DOCUMENTS 780,086 A 1/1905 Brewer et al.
1,946,736 A * 2/1934 Frey .......................... 273/139
4,157,829 A 6/1979 Goldman et al.
4,332,389 A 6/1982 Loyd et al.
4,335,809 A 6/1982 Wain
4,339,798 A 7/1982 Hedges et al.
4,365,810 A 12/1982 Richardson
4,373,726 A 2/1983 Churchill et al.
4,448,419 A 5/1984 Telnaes
4,455,025 A 6/1984 Itkis (Continued)

FOREIGN PATENT DOCUMENTS

GB 2 374 294 A 10/2002

(Continued)

OTHER PUBLICATIONS

Diamonopoly Advertisement by International Gamco, Inc., published 2002.

(Continued)

*Primary Examiner*—Peter DungBa Vo
*Assistant Examiner*—Jasson H Yoo
(74) *Attorney, Agent, or Firm*—K&L Gates LLP

(57) ABSTRACT

A central determination gaming system which provides a player a choice in outcomes. In one embodiment of the present invention, upon a player initiating a game play at one of a plurality of gaming terminals in communication with a central controller, the central controller selects a plurality of game outcomes from a pool of game outcomes. The selected game outcomes are communicated to the gaming terminal and the gaming terminal provides one of the selected game outcomes to the player based on at least one choice made by the player regarding the game play. The provided game outcome is prevented from further selections from the pool of game outcomes.

43 Claims, 7 Drawing Sheets

U.S. PATENT DOCUMENTS

| | | | | |
|---|---|---|---|---|
| 4,467,424 | A | 8/1984 | Hedges et al. | |
| 4,494,197 | A | 1/1985 | Troy et al. | |
| 4,527,798 | A | 7/1985 | Siekierski et al. | |
| 4,582,324 | A | 4/1986 | Koza et al. | |
| 4,624,462 | A | 11/1986 | Itkis | |
| 4,636,951 | A | 1/1987 | Harlick | |
| 4,652,998 | A | 3/1987 | Koza et al. | |
| 4,669,730 | A | 6/1987 | Small | |
| 4,679,143 | A | 7/1987 | Hagiwara | |
| 4,689,742 | A | 8/1987 | Troy et al. | |
| 4,798,387 | A | 1/1989 | Richardson | |
| 4,805,907 | A | 2/1989 | Hagiwara | |
| 4,815,741 | A | 3/1989 | Small | |
| 4,817,951 | A | 4/1989 | Crouch et al. | |
| 4,842,278 | A | 6/1989 | Markowicz | |
| 4,848,771 | A | 7/1989 | Richardson | |
| 4,856,787 | A | 8/1989 | Itkis | |
| 4,880,237 | A | 11/1989 | Kishishita | |
| 4,882,473 | A | 11/1989 | Bergeron et al. | |
| 4,982,337 | A | 1/1991 | Burr et al. | |
| 5,007,649 | A | 4/1991 | Richardson | |
| 5,042,809 | A | 8/1991 | Richardson | |
| 5,092,598 | A | 3/1992 | Kamille | |
| 5,100,139 | A | 3/1992 | Di Bella | |
| 5,119,295 | A | 6/1992 | Kapur | |
| 5,158,293 | A | 10/1992 | Mullins | |
| 5,223,698 | A | 6/1993 | Kapur | |
| 5,265,874 | A | 11/1993 | Dickinson et al. | |
| 5,275,400 | A | 1/1994 | Weingardt et al. | |
| 5,276,312 | A | 1/1994 | McCarthy | |
| 5,282,620 | A | 2/1994 | Keesee | |
| 5,297,802 | A | 3/1994 | Pocock et al. | |
| 5,324,035 | A | 6/1994 | Morris et al. | |
| 5,326,104 | A | 7/1994 | Pease et al. | |
| 5,348,299 | A | 9/1994 | Clapper, Jr. | |
| 5,351,970 | A | 10/1994 | Fioretti | |
| 5,377,975 | A | 1/1995 | Clapper, Jr. | |
| 5,393,061 | A | 2/1995 | Manship et al. | |
| 5,398,932 | A | 3/1995 | Eberhardt et al. | |
| 5,407,199 | A | 4/1995 | Gumina | |
| 5,476,259 | A | 12/1995 | Weingardt | |
| 5,487,544 | A | 1/1996 | Clapper, Jr. | |
| 5,536,008 | A | 7/1996 | Clapper, Jr. | |
| 5,542,669 | A | 8/1996 | Charron et al. | |
| 5,562,284 | A | 10/1996 | Stevens | |
| 5,564,701 | A | 10/1996 | Dettor | |
| 5,580,311 | A | 12/1996 | Haste, III | |
| 5,586,937 | A | 12/1996 | Menashe | |
| 5,595,538 | A | 1/1997 | Haste, III | |
| 5,609,337 | A | 3/1997 | Clapper, Jr. | |
| 5,628,684 | A | 5/1997 | Bouedec | |
| 5,630,754 | A | 5/1997 | Rebane | |
| 5,645,485 | A | 7/1997 | Clapper, Jr. | |
| 5,657,899 | A | 8/1997 | Stoken | |
| 5,674,128 | A | 10/1997 | Holch et al. | |
| 5,697,843 | A | 12/1997 | Manship et al. | |
| 5,720,483 | A | 2/1998 | Trinh | |
| 5,735,432 | A | 4/1998 | Stoken et al. | |
| 5,749,784 | A | 5/1998 | Clapper, Jr. | |
| 5,779,545 | A | 7/1998 | Berg et al. | |
| 5,779,547 | A | 7/1998 | SoRelle et al. | |
| 5,800,269 | A | 9/1998 | Holch et al. | |
| 5,810,664 | A | 9/1998 | Clapper, Jr. | |
| 5,830,067 | A | 11/1998 | Graves et al. | |
| 5,855,515 | A | 1/1999 | Pease et al. | |
| 5,871,398 | A | 2/1999 | Schneier et al. | |
| 5,876,283 | A | 3/1999 | Parra et al. | |
| 5,882,260 | A | 3/1999 | Marks et al. | |
| 5,915,588 | A | 6/1999 | Stoken et al. | |
| 5,928,082 | A | 7/1999 | Clapper, Jr. | |
| 5,941,771 | A | 8/1999 | Haste, III | |
| 5,944,606 | A | 8/1999 | Gerow | |
| 5,949,042 | A | 9/1999 | Dietz, II et al. | |
| 5,954,582 | A | 9/1999 | Zach | |
| 5,970,143 | A | 10/1999 | Schneier et al. | |
| 5,980,385 | A | 11/1999 | Clapper, Jr. | |
| 5,984,779 | A | 11/1999 | Bridgeman et al. | |
| 5,996,997 | A | 12/1999 | Kamille | |
| 6,012,984 | A | 1/2000 | Roseman | |
| 6,017,032 | A | 1/2000 | Grippo et al. | |
| 6,024,640 | A | 2/2000 | Walker et al. | |
| 6,056,289 | A | 5/2000 | Clapper, Jr. | |
| 6,062,981 | A | 5/2000 | Luciano, Jr. | |
| 6,079,711 | A | 6/2000 | Wei et al. | |
| 6,089,982 | A | 7/2000 | Holch et al. | |
| 6,093,100 | A | 7/2000 | Singer et al. | |
| 6,099,408 | A | 8/2000 | Schneier et al. | |
| 6,117,009 | A | 9/2000 | Yoseloff | |
| 6,120,024 | A | 9/2000 | Lind | |
| 6,146,272 | A | 11/2000 | Walker et al. | |
| 6,155,925 | A | 12/2000 | Giobbi et al. | |
| 6,159,095 | A | 12/2000 | Frohm et al. | |
| 6,168,521 | B1 | 1/2001 | Luciano et al. | |
| 6,174,233 | B1 | 1/2001 | Sunaga et al. | |
| 6,183,361 | B1 | 2/2001 | Cummings et al. | |
| 6,210,275 | B1 | 4/2001 | Olsen | |
| 6,210,276 | B1 | 4/2001 | Mullins | |
| 6,217,448 | B1 | 4/2001 | Olsen | |
| 6,220,961 | B1 | 4/2001 | Keane et al. | |
| 6,241,606 | B1 | 6/2001 | Riendeau et al. | |
| 6,250,685 | B1 | 6/2001 | Walker et al. | |
| 6,254,480 | B1 | 7/2001 | Zach | |
| 6,273,820 | B1 | 8/2001 | Haste, III | |
| 6,280,325 | B1 | 8/2001 | Fisk | |
| 6,280,328 | B1 | 8/2001 | Holch et al. | |
| 6,302,791 | B1 | 10/2001 | Frohm et al. | |
| 6,306,038 | B1 | 10/2001 | Graves et al. | |
| 6,309,298 | B1 | 10/2001 | Gerow | |
| 6,315,289 | B1 | 11/2001 | Sakamoto et al. | |
| 6,325,716 | B1 | 12/2001 | Walker et al. | |
| 6,358,150 | B1 | 3/2002 | Mir et al. | |
| 6,358,151 | B1 | 3/2002 | Enzminger et al. | |
| 6,368,218 | B2 | 4/2002 | Angell, Jr. | |
| 6,386,977 | B1 | 5/2002 | Hole | |
| 6,402,614 | B1 | 6/2002 | Schneier et al. | |
| 6,419,583 | B1 | 7/2002 | Crumby et al. | |
| 6,443,837 | B1 | 9/2002 | Jaffe et al. | |
| 6,447,395 | B1 | 9/2002 | Stevens | |
| 6,450,885 | B2 | 9/2002 | Schneier et al. | |
| 6,454,648 | B1 | 9/2002 | Kelly et al. | |
| 6,454,649 | B1 | 9/2002 | Mattice et al. | |
| RE37,885 | E | 10/2002 | Acres et al. | |
| 6,471,591 | B1 | 10/2002 | Crumby | |
| 6,475,086 | B2 | 11/2002 | Zach | |
| 6,508,711 | B1 | 1/2003 | Ono | |
| 6,524,184 | B1 | 2/2003 | Lind et al. | |
| 6,524,185 | B2 | 2/2003 | Lind | |
| 6,527,638 | B1 | 3/2003 | Walker et al. | |
| 6,533,664 | B1 | 3/2003 | Crumby | |
| 6,537,150 | B1 * | 3/2003 | Luciano et al. | 463/16 |
| 6,569,017 | B2 | 5/2003 | Enzminger et al. | |
| 6,599,187 | B2 | 7/2003 | Gerow | |
| 6,656,040 | B1 | 12/2003 | Brosnan et al. | |
| 6,656,044 | B1 | 12/2003 | Lewis | |
| 6,729,961 | B1 | 5/2004 | Millerschone | |
| 6,749,500 | B1 | 6/2004 | Nelson et al. | |
| 6,866,584 | B2 | 3/2005 | Michaelson | |
| 6,988,946 | B2 | 1/2006 | Michaelson et al. | |
| 2002/0010013 | A1 | 1/2002 | Walker et al. | |
| 2002/0019260 | A1 * | 2/2002 | Angell, Jr. | 463/40 |
| 2002/0039917 | A1 | 4/2002 | Armstrong et al. | |
| 2002/0072404 | A1 | 6/2002 | Gerow | |
| 2002/0077173 | A1 | 6/2002 | Luciano et al. | |
| 2002/0077174 | A1 | 6/2002 | Luciano et al. | |

| | | | |
|---|---|---|---|
| 2002/0082070 | A1 | 6/2002 | Macke et al. |
| 2002/0082071 | A1 | 6/2002 | Riendeau et al. |
| 2002/0082085 | A1 | 6/2002 | Osterer |
| 2002/0090986 | A1 | 7/2002 | Cote et al. |
| 2002/0094871 | A1 | 7/2002 | Luciano et al. |
| 2002/0098882 | A1 | 7/2002 | Lind et al. |
| 2002/0098883 | A1 | 7/2002 | Packes, Jr. et al. |
| 2002/0111207 | A1 | 8/2002 | Lind et al. |
| 2002/0111214 | A1 | 8/2002 | Lind et al. |
| 2002/0113369 | A1 | 8/2002 | Weingardt |
| 2002/0132661 | A1 | 9/2002 | Lind et al. |
| 2002/0132666 | A1 | 9/2002 | Lind et al. |
| 2002/0169018 | A1 | 11/2002 | Schneier et al. |
| 2003/0100371 | A1 | 5/2003 | Gatto et al. |
| 2003/0100372 | A1 | 5/2003 | Gatto et al. |
| 2003/0125101 | A1 | 7/2003 | Campo |
| 2003/0181231 | A1 | 9/2003 | Vancura et al. |
| 2003/0193136 | A1 | 10/2003 | Walker et al. |
| 2003/0211884 | A1 | 11/2003 | Gauselmann |
| 2004/0204231 | A1 | 10/2004 | Martin et al. |

FOREIGN PATENT DOCUMENTS

| | | | |
|---|---|---|---|
| RU | 17443 | U1 | 4/2001 |
| RU | 17678 | U1 | 4/2001 |
| WO | WO 00/67424 | | 11/2000 |
| WO | WO 02/097749 | A2 | 12/2002 |

OTHER PUBLICATIONS

Electronic Pull Tabs Advertisement by 21st Century Gaming, published prior to 2002.

Lucky Times California Lottery Newsletter published 1996.

Instant Winner Advertisement by Williams/WMS Gaming, published prior to 2002.

Play it again Advertisement by International Gamco, Inc. published 00.

* cited by examiner

CENTRAL DETERMINATION GAMING SYSTEM WHICH PROVIDES A PLAYER A CHOICE IN OUTCOMES

PRIORITY CLAIM

This application is a continuation application of, claims priority to and the benefit of U.S. patent application Ser. No. 10/442,318, filed on May 20, 2003, the entire contents of which are incorporated herein.

CROSS-REFERENCE TO RELATED APPLICATIONS

This application relates to the following co-pending commonly owned patent applications: "GAMING DEVICE INCLUDING OUTCOME POOLS FOR PROVIDING GAME OUTCOMES," Ser. No. 10/261,744, "CENTRAL DETERMINATION GAMING SYSTEM WHERE THE SAME SEED IS USED TO GENERATE THE OUTCOMES FOR A PRIMARY GAME AND A SECONDARY GAME," Ser. No. 10/371,958, "CENTRAL DETERMINATION GAMING SYSTEM WITH A GAME OUTCOME GENERATED BY A GAMING TERMINAL AND APPROVED BY A CENTRAL CONTROLLER," Ser. No. 10/383,423, "CENTRAL DETERMINATION GAMING SYSTEM WITH A GAMING TERMINAL ASSISTING THE CENTRAL CONTROLLER IN THE GENERATION OF A GAME OUTCOME," Ser. No. 10/431,755, "CENTRAL DETERMINATION GAMING SYSTEM WITH A KENO GAME" Ser. No. 10/601,482, "APPARATUS AND METHOD FOR GENERATING A POOL OF SEEDS FOR A CENTRAL DETERMINATION GAMING SYSTEM," Ser. No. 11/046,354, "APPARATUS AND METHOD FOR GENERATING A POOL OF SEEDS FOR A CENTRAL DETERMINATION GAMING SYSTEM," Ser. No. 11/071,372, "CENTRAL DETERMINATION GAMING SYSTEM WITH A CENTRAL CONTROLLER PROVIDING A GAME OUTCOME AND A GAMING TERMINAL DETERMINING A PRESENTATION OF THE PROVIDED GAME OUTCOME," Ser. No. 11/303,585.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a central determination gaming system, and more particularly to a central determination gaming system which provides a player a choice in outcomes. The majority of the contemporary wagering gaming devices or gaming terminals, such as slot machines, randomly generate awards and other outcomes. Such gaming terminals typically include a relatively low probability associated with obtaining the highest award, relatively medium probabilities associated with obtaining medium range awards and relatively higher probabilities associated with obtaining low range awards. These gaming terminals also include probabilities associated with obtaining losses or no award at all. The probabilities of obtaining the awards and the amount of the awards determine the average expected pay out percentage of these wagering gaming terminals. Because the outcomes of these gaming terminals are completely randomly determined, there is no certainty that a player will ever obtain any particular award. That is, no matter how many times a player plays the game, since the gaming terminal generates outcomes randomly or completely based upon a probability calculation, there is no certainty that the game will ever provide the player with a rare outcome, such as a jackpot award, or any other specific value for that matter. On the other hand, due to the random determination, the gaming terminal can provide the rare outcomes, such as jackpot awards, numerous times in a small number of plays. For example, a probability-based $1 slot machine gaming terminal may be programmed to payback 95% of all wagers placed with a 1% chance of generating a $10 win outcome, a 5% chance of generating a $5 win outcome, a 10% chance of generating a $2 win outcome, a 40% chance of generating a $1 win outcome and a 44% chance of generating a $0 loss outcome. However, when one hundred game outcomes are generated by the probability-based slot machine gaming terminal, the actual payback may be 137% of all wagers placed and the actual generated outcomes may be six $10 win outcomes, one $5 win outcome, eighteen $2 win outcomes, thirty-six $1 win outcomes and thirty-nine $0 loss outcomes.

This uncertainty is faced by players and casinos or other gaming establishments. For example, certain casinos prefer that a relatively high number of players hit low awards while a relatively low number of players hit high awards. When players hit high awards periodically, casinos attract more players, because of the positive publicity large wins generate. By using desired payback percentages or probabilities, the casinos can also expect to make a certain level of profit. The random determinations can, however, unexpectedly cause casinos to suffer a loss or, on the other hand, to reap great profit in the short run and lose business in the long run due to a reputation for only paying out low awards.

Regulatory bodies in certain jurisdictions do not permit the use of probability-based gaming terminals in-part for these reasons. These regulatory bodies permit the use of wagering gaming terminals which are guaranteed to provide certain or definite awards, so that, for example, a certain number of wins is guaranteed and the overall amount paid back to players is guaranteed. That is, the payback percentage is fixed and not an average expected amount. One type of gaming terminal which complies with this requirement is an instant-type lottery gaming terminal. An instant-type lottery gaming terminal includes a finite pool or set of electronic tickets with each electronic ticket assigned to a predetermined outcome. Alternatively, each electronic ticket could be assigned to a random number or game play seed. Each seed is deterministic of a predetermined outcome. That is, the gaming terminal utilizes the random number or game play seed in a random number generating algorithm to generate random numbers that the gaming terminal then uses to determine and provide the predetermined outcome. In an instant-type lottery gaming terminal, as the predetermined outcome for each electronic ticket is revealed to a player on the gaming terminal, the ticket is removed (i.e., flagged as used) from the finite pool or set of electronic tickets. Once removed from the pool or set, a ticket cannot be used again to determine another game outcome. This type of gaming terminal provides players with all of the available outcomes over the course of the play cycle and guarantees the actual wins and losses.

Since an instant-type lottery gaming machine has a finite pool of predetermined win/loss outcomes, it is possible to configure the pool to specific conditions or criteria requested by the casino or gaming establishment. An example of these conditions or criteria are the number of tickets included in the pool and the exact payback percentage or payback sum for the pool as a whole. The payback percentage or sum represents the guaranteed payout for the entire pool of predetermined outcomes. Other examples of conditions or criteria are what prizes will be awarded and the frequency of winning outcome tickets amongst the total number of tickets for the pool. For example, if a predetermined pool includes twenty $1 tickets and the pool has a payback sum of $10, then the pool might consist of one $5 win outcome, one $2 win outcome, three $1 win outcomes and fifteen $0 loss outcomes and may be represented as the following outcomes: 5, 2, 1, 1, 1, 0, 0, 0, 0, 0, 0, 0, 0, 0, 0, 0, 0, 0, 0, 0. It should be appreciated that the above described pool of twenty tickets is for illustration purposes only and a pool could include any suitable desired number of tickets including a large number such as one million or more.

Even though a pool may contain more than one of the same game outcome (i.e., the loss or the win and if a win, the value), the presentation to the player (such as reel stops in the case of slot machines or simulated slot machines, cards dealt or drawn in the case of simulated card games and the like) is preferably varied for each sequential game outcome. For example, in the twenty ticket pool described above, while three game outcomes may each determine a win game outcome with a value of $1, in a slot machine type game each game outcome will be preferably presented to the player as multiple different or all different winning combinations of reel symbols.

Central determination gaming systems are also generally known. A central determination gaming system provides a plurality of individual gaming terminals, located in a gaming establishment, such as a casino, coupled by one or more communication links, to a central processor or controller. When a player plays a game on one of the gaming terminals, a game outcome is randomly generated based on probability data by the central controller. The generated game outcome and how the game outcome is to be presented or displayed to the player are communicated from the central controller to the individual gaming terminal and then provided to the player. It should be appreciated that one central processor may continuously run hundreds or thousands of individual gaming terminals at once. Additionally, each individual gaming terminal may include a plurality of different types of games played at a plurality of different denominations.

In order to comply with the above mentioned regulatory rules that do not permit the use of probability-based gaming terminals, central determination gaming systems have been implemented wherein the central system maintains one or more predetermined pools or sets of game outcomes. Each game outcome in each set or pool includes a game outcome component (i.e., a win, a lose, a secondary game trigger or other suitable outcome) with an associated value or payout amount, if any, and a game presentation component (i.e., how the game outcome is displayed or presented to the player). In these systems, when a player makes a wager on one of the gaming devices, the central system independently selects a game outcome from a set or pool of game outcomes and flags or marks the selected game outcome as used. Once a game outcome is flagged as used, it is prevented from further selection from the set or pool and cannot be selected by the central controller upon another wager. The selected game outcome is communicated to the individual gaming terminal. The individual gaming terminal displays or presents the game presentation component and provides the player the game outcome component with the associated value, if any, for the selected game outcome. Additionally, certain central determination gaming systems have also been implemented wherein the central system maintains one or more predetermined pools or sets of random number or game outcome seeds.

There are a number of advantages to providing for centralized production of game outcomes at individual gaming terminals. Central production or control can assist a casino or other entity in maintaining appropriate records, controlling gaming, reducing and preventing cheating or electronic or other errors, reducing or eliminating win-loss volatility and the like. However, it should be appreciated that existing central determination gaming systems involve minimal to no player interaction other than initiating a game play at a gaming terminal. That is, similar to an instant type lottery game, the central controller selects a game outcome from the pool and the selected game outcome is provided to the player with the player unable to influence the provided game outcome. Therefore, the need exists for a central determination gaming system that provides an increases level of player interaction in the determination of the outcome provided to the player.

Gaming devices having a primary or base game and a secondary or a bonus game are also well known. A secondary or bonus game may be any type of suitable game, either similar to or completely different from the primary game, which is entered upon the occurrence of a triggering event or a selected outcome in the primary game. The secondary or bonus game enables the player to obtain a prize or payout in addition to the prize or payout, if any, obtained from the primary game. A secondary or bonus game produces a significantly higher level of player excitement than the primary game because it provides a greater expectation of winning than the primary game and is accompanied with more attractive or unusual features than the primary game.

SUMMARY OF THE INVENTION

The present invention relates to a central determination gaming system which provides a player a choice which results in one of a plurality of outcomes. In one embodiment of the present invention, upon a player initiating a game play at one of a plurality of gaming terminals in communication with a central controller, the central controller selects a plurality of game outcomes from a pool or set of predetermined game outcomes. The initiated game provides the player at least one and preferably a plurality of choices or decisions during game play.

In one embodiment, the number of game outcomes selected is equal to the number of different choices that a player could possibly make during game play. That is, each game outcome corresponds with a different choice or decision the player may make concerning the play of the game and the player is provided one of the selected game outcomes based on the choice or decision the player makes. In one embodiment, a plurality of the game outcomes the player may possibly be provided are different. In another embodiment, all of the game outcomes the player may possibly be provided are different. For example, if the initiated game provides a choice of four different options for the player to decide from (i.e., a choice between four different player selectable selections), then the central controller selects four game outcomes from the pool of game outcomes. In another embodiment, the number of game outcomes selected is less then the number of different choices the player could make during the play of the game. In this embodiment, at least one game outcome will be associated with more than one player choice.

Each game outcome includes an outcome component, such as a win, a lose, a secondary game triggering or other suitable outcome, with an associated value or pay amount, if any. Each game outcome may also include, based on the specific game played on the gaming terminal, a presentation component. A presentation component is how the game outcome is presented or displayed to the player, such as a reel symbol combination of a slot machine or a hand of cards dealt in a card game.

The central controller marks or flags each selected game outcome in the pool as used or unavailable. Once a game outcome is marked or flagged it is prevented from a subsequent selection from the pool upon another game play. It should be appreciated that if the mark or flag is removed from a game outcome, that game outcome is again available to be selected from the pool during a subsequent selection. The central controller communicates the selected game outcomes to the requesting gaming terminal.

Upon receiving the plurality of selected game outcomes, in one embodiment, the gaming terminal associates each selected game outcome with a different choice or decision the player can make during play of the initiated game. In another embodiment, each selected game outcome is already associated (by the central controller or other suitable method) with a different choice or decision the player can make during play of the initiated game.

The gaming terminal enables the player to make at least one choice or decision regarding the play of the initiated game. In another embodiment, the gaming terminal enables the player to make a plurality of choices or decisions regarding the play of the initiated game. After the player makes at least one choice or decision, the gaming terminal determines the game outcome that corresponds with the player's choice or decision. The gaming terminal then provides the player one of the selected game outcomes based on the player's choice or decision. That is, the player's choice or decision during the course of game play directly relates to the game outcome ultimately provided to the player. If the game outcome is a win or a lose outcome, the gaming terminal provides the associated value or payout amount, if any, to the player and the game play ends. If the game outcome is a secondary game trigger, the gaming terminal provides the associated value or payout amount, if any, to the player and the gaming terminal enables the player to play at least one secondary game.

After the gaming terminal provides the player a game outcome that is based on the player's choice or decision, the gaming terminal communicates to the central controller which game outcome was provided to the player and/or which game outcome(s) were not provided to the player. That is, since the central determination gaming system of the present invention provides all of the game outcomes from the pool of game outcomes over the course of the play cycle and the selected non-provided game outcomes are flagged as unavailable, it is necessary for the gaming terminal to communicate to the central controller which game outcome was provided to the player and/or which game outcome(s) were not used or provided to the player in order for the central controller to insure that the selected non-provided game outcomes are once again available to be subsequently provided to a player.

In one embodiment, the gaming terminal communicates each of the remaining non-provided game outcomes back to the central controller. In this embodiment, the central controller removes the mark or flag from each returned game outcome, thereby enabling the returned game outcomes to be selected and communicated to a gaming terminal in a subsequent game play. In another embodiment, the gaming terminal communicates to the central controller information or data concerning which game outcome was provided to the player and/or which game outcome(s) were not used or provided to the player. In this embodiment, the central controller removes the mark or flag on each game outcome not provided to the player, thereby enabling the non-provided game outcomes to be selected and communicated to a gaming terminal in a subsequent game play.

In an alternative embodiment, the non-provided game outcomes are retained by the gaming terminal and not returned to the central controller. In this embodiment, the plurality of selected game outcomes communicated from the central controller are stored in a cache or memory device of the gaming terminal. Upon a player initiating a game play, the gaming terminal requests a number of game outcomes, if any, based on the number of game outcomes currently in the cache and the number of game outcomes needed to play the game. After the central controller selects, flags and communicates the needed number of game outcomes, the communicated game outcomes are added to the cache. The gaming terminal then selects a plurality of game outcomes from the cache and associates the selected game outcomes with the plurality of choices or decisions that could be made during the game play. This embodiment proceeds as described above, however after a game outcome is provided to the player based on the player's choice or decision during the game play, the gaming terminal removes the provided game outcome from the cache or memory device and retains the non-provided game outcomes in the cache or memory device. Upon a player initiating a subsequent game at the gaming terminal, if needed, the central controller communicates a new game outcome request to the central controller.

In one embodiment illustrating the present invention in a slot machine gaming terminal, upon a player initiating a game play, the reels begin to spin. While the reels are spinning, the central controller selects a plurality of game outcomes, flags the plurality of selected game outcomes as unavailable and communicates the plurality of selected game outcomes to the gaming terminal as described above. It should be appreciated that in this embodiment, each game outcome in the pool of game outcomes has an associated presentation component. That is, each game outcome is associated with a specific reel symbol combination to be displayed or presented to the player if that game outcome is provided to the player.

Upon receiving the plurality of selected game outcomes, the gaming terminal associates each received game outcome with a different choice or decision the player could possibly make during the play of the slot game. The gaming terminal then enables the player to make at least one choice or decision concerning the play of the slot game. For example, the gaming terminal enables the player to choose or decide when to stop the reels from spinning, wherein when the player decides to stop the reels is associated with one of the selected game outcomes. It should be appreciated that the gaming terminal or central controller is operable to associate the plurality of selected game outcomes with any other suitable plurality of choices or decisions the player could possibly make concerning the play of the slot game. For instance, the gaming terminal or central controller may associate the plurality of selected game outcomes with the plurality of choices or decisions the player could possibly make in a strategy bonus game.

After the player has made at least one choice or decision regarding the play of the slot game, the gaming terminal provides the player with the selected game outcome associated with the player's choice or decision. For example, if the gaming terminal had associated a win $2 game outcome with the player's choice or decision to stop the reels after spinning for between 1.5 and 2.0 seconds and the player decided to stop the reels after 1.8 seconds, then the gaming terminal would provide the player the associated win $2 game outcome and display the appropriate presentation of reel symbol combinations for the provided game outcome. It should be appreciated that through the use of an appropriate pay table for the specific game played, the presentation component for each game outcome corresponds to the outcome component and associated value, if any, for that game outcome. The gaming terminal communicates to the central controller which selected game outcome was provided/not provided in order for the central controller to remove the flag from the non-provided selected game outcomes as described above.

In an alternative embodiment of the present invention, the gaming terminal offers the player an initial game outcome and enables the player to make at least one choice or decision that may modify the initial game outcome. In this embodiment, upon the initiation of a game at a gaming terminal, the central controller selects one game outcome from the pool of game outcomes and designates the selected game outcome as an initial game outcome. The initial game outcome represents the game outcome that the player will base his choice(s) or decision(s) on. For example, the initial outcome may be the initial hand of cards dealt to the player. The central controller then selects a plurality of potential game outcome that could be obtained based on the choice(s) or decision(s) the player makes in respect to the initial game outcome. It should be appreciated that a plurality of the potential game outcomes are associated with or correspond to the plurality of choices or decisions the player can possibly make during the play of the game based on the initial outcome.

After selecting the initial game outcome and the plurality of potential game outcomes, the central controller flags each selected game outcome and communicates each selected game outcome to the gaming terminal as described above. The gaming terminal offers the player the designated initial game outcome and enables the player to make at least one choice or decision regarding the play of the initial game outcome. The player's choice or decision determines the game outcome that will be provided to the player. If the player is satisfied with the offered initial game outcome, then the player is provided the initial game outcome and not one of the plurality of potential game outcomes. In this case, the game outcome ultimately provided to the player (the initial game outcome) is still based on the player's choice or decision (the decision to accept the initial game outcome).

In one embodiment illustrating a poker style gaming terminal, the central controller selects a game outcome from the pool or set of game outcomes and designates the selected game outcome as the initial game outcome. The central controller then selects thirty-one game outcomes from the pool or set and designates these selected game outcomes as potential game outcomes. The thirty-one potential game outcomes are associated with the thirty-one different outcomes that can possibly be obtained from the initial game outcome based on the player's decision to discard at least one card. For instance, one selected potential game outcome may be a win $2 game outcome that the player obtains if the player holds the first, third and fifth card and discards the second and fourth cards for new cards, while another selected potential game outcome may be a lose or $0 game outcome that the player obtains if the player holds the second, third and fourth card and discards the first and fifth card for new cards. The initial game outcome is associated with the game outcome that will be obtained if the player is satisfied with the initial game outcome and decides to hold each card. That is, the thirty-one potential game outcomes coupled with the initial game outcome represent the thirty-two different game outcomes that can possibly be obtained based on the player's decision of how to play the initial game outcome offered to the player (the five cards that are initially dealt). It should be appreciated that the game presentation component of a plurality of the potential game outcomes are each related to the game outcome presentation of the initial game outcome. That is, the game presentation component for the potential game outcome associated with the player holding the second, third and fourth cards of the initial game outcome (i.e., the initial poker hand), will include the same second, third and fourth cards as the game presentation component of the initial game outcome.

In this embodiment, the central controller flags the plurality of selected game outcomes (the initial game outcome and the plurality of potential game outcomes) and communicates the plurality of selected game outcomes to the central controller as described above.

Upon receiving the selected game outcomes, the gaming terminal offers the initial game outcome to the player (i.e., displays five cards in a poker style game). The gaming terminal then enables the player to make at least one and preferable a plurality of choices regarding the initial game outcome offered to the player. For example, the gaming terminal enables the player to hold or discard each presented card. Depending on the player's choice concerning the play of the game, (i.e., which cards the player decides to hold or discard), the gaming terminal selects the potential game outcome that is associated with the choice or decision the player made. The gaming terminal provides the player the game outcome associated with the player's choice or decision. For example, if the player choose to discard the fourth and fifth cards, then the gaming terminal would provide the player a win $1 game outcome that is associated with the player discarding the fourth and fifth cards. If the player's choice is not to discard any cards but to hold each of the cards initially dealt, then the initial game outcome is provided to the player. It should be appreciated that the presentation of the provided game outcome may be similar to the presentation of the initial game outcome. That is, if the player decided to hold the first, second and third cards and discard the fourth and fifth cards, then the provided game outcome will be presented to the player with the same first, second and third cards as the initial game outcome.

After the gaming terminal provides the player a game outcome that is based on the player's decision, the gaming terminal communicates which game outcomes were provided/not provided to the central controller, as described above, to enable the non-provided game outcomes to be reselected and communicated to a gaming terminal in a subsequent game play.

It should be appreciated that the above described embodiments of the present invention can also be implemented with a pool of game outcome seeds. Each game outcome seed is a unique random number seed which is deterministic of a game outcome, such as a win outcome, a lose outcome or a secondary or bonus game triggering outcome. In this embodiment, the central controller selects, flags and communicates a plurality of game outcome seeds to the gaming terminal in an identical fashion to the central controller selecting, flagging and communicating a plurality of game outcomes as described above. Upon receiving the plurality of game outcome seeds, the gaming terminal utilizes the selected game outcome seeds in a random number generating algorithm to generate at least one and preferably a plurality of random numbers. The gaming terminal then uses the generated random numbers to determine the game outcome which each game outcome seed is deterministic of. The plurality of determined game outcomes are then associated with the plurality choices or decisions available to the player and the game proceeds as described above.

The present invention provides a number of advantages over existing central determination gaming systems. For example, since the gaming terminals of the present invention enable the player to make a choice or decision about the ultimate game outcome that they will receive, the present invention includes an aspect of player interaction and player involvement for central determination gaming systems. That is, the present invention complies with certain regulations that require that a central controller maintains a pool of predetermined game outcomes (which guarantees a specific amount of actual wins and losses), while also providing the player a level of control over the play of the game. This increases the player's level of excitement and enjoyment.

Additional features and advantages of the present invention are described in, and will be apparent from, the following Detailed Description of the Invention and the figures.

DETAILED DESCRIPTION OF THE INVENTION

Figure 1:
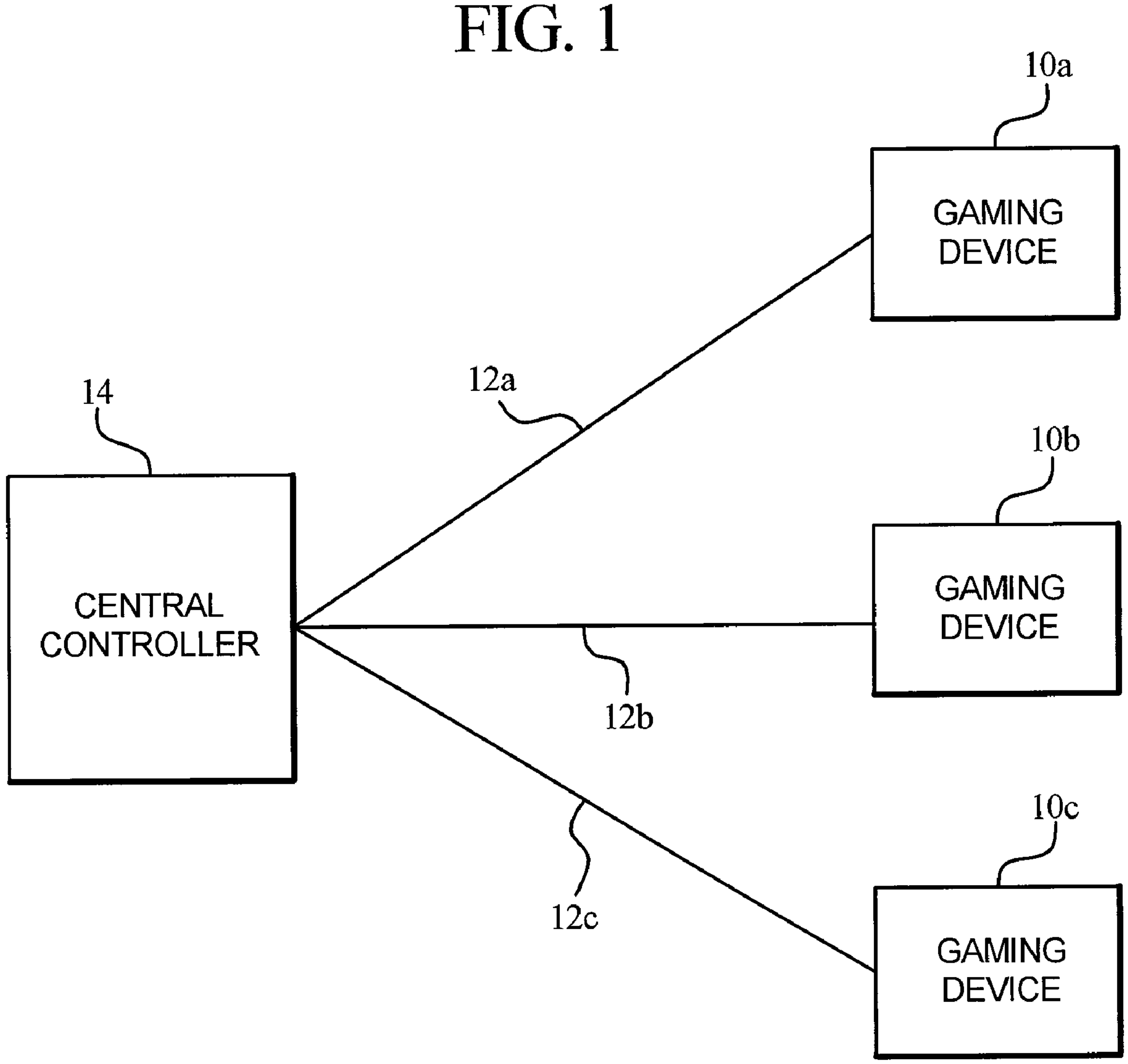
FIG. 1 is a schematic block diagram illustrating a plurality of gaming terminals in communication with a central controller.

Referring now to the drawings, as illustrated in FIG. 1, one embodiment of the present invention includes a plurality of gaming devices or gaming terminals 10*a*, 10*b* and 10*c* located in a gaming establishment, such as a casino, coupled by one or more communication links 12*a*, 12*b* and 12*c* to a central computing system or central controller 14. The communication links 12 can be any of a plurality of devices known to those of skill in the art for receiving data transmissions to and from the gaming terminal. The central processor maintains supervision over the entire network of gaming terminals.

In one embodiment, the central controller maintains at least one predetermined set or pool of predetermined game outcomes for each type of game provided on the gaming terminals. In an alternative embodiment, the central controller maintains a plurality of predetermined sets or pools of predetermined game outcomes for each type of provided game. In another embodiment, the central controller maintains a predetermined set or pool of predetermined game outcomes for each denomination of each type of game provided on the gaming terminals. In another embodiment, the central controller maintains at least one predetermined set or pool of predetermined game outcome seeds. Each game outcome seed is deterministic of a predetermined game outcome. Other methods for storing the pool or set of predetermined game outcomes may be employed in accordance with the present invention.

Each predetermined game outcome includes an outcome component, such as a win, a lose, a secondary game triggering or other suitable outcome, with an associated value or pay amount, if any. For example, one game outcome may be a win $5 game outcome and another game outcome may be a lose or $0 game outcome. Each set or pool of predetermined game outcomes may include a plurality of each type of predetermined game outcome. For example, a pool of one thousand game outcomes may include hundreds of a lower range award (i.e., a win $1 game outcome) and one or few of the highest award (i.e., a win $1000 game outcome). In one embodiment, a plurality of the game outcomes in the predetermined set or pool are different. In another embodiment, all of the game outcomes in the set or pool are different.

Depending on the specific game player, each game outcome may also include a presentation component. A presentation component is how the predetermined game outcome is presented or displayed to the player, such as a reel symbol combination of a slot machine or a hand of cards dealt. In order to increase player entertainment, a plurality of game outcomes with the same outcome component and associated value have different presentation components. That is, the same win $5 game outcome is presented or displayed to the player in a plurality of different ways. For example, in a poker style game, each of the same game outcomes are displayed or presented to the player as a different hand of cards. It should be appreciated that through the use of an appropriate pay table for the specific game played, the presentation component for each game outcome corresponds to the outcome component and associated value, if any, for that game outcome.

In one embodiment, all of the gaming terminals which are coupled to the central processor are configured to play the same type of game. In an alternative embodiment, a plurality of the gaming terminals are configured so that different gaming terminals may be used to play different types of games. That is, some gaming terminals may be used for playing a slot machine style game, others may be used for playing a poker style game, others may be used for playing a blackjack style game, and the like. In another embodiment, a plurality of gaming terminals may each be configured for playing a plurality of different games.

Figure 2A:
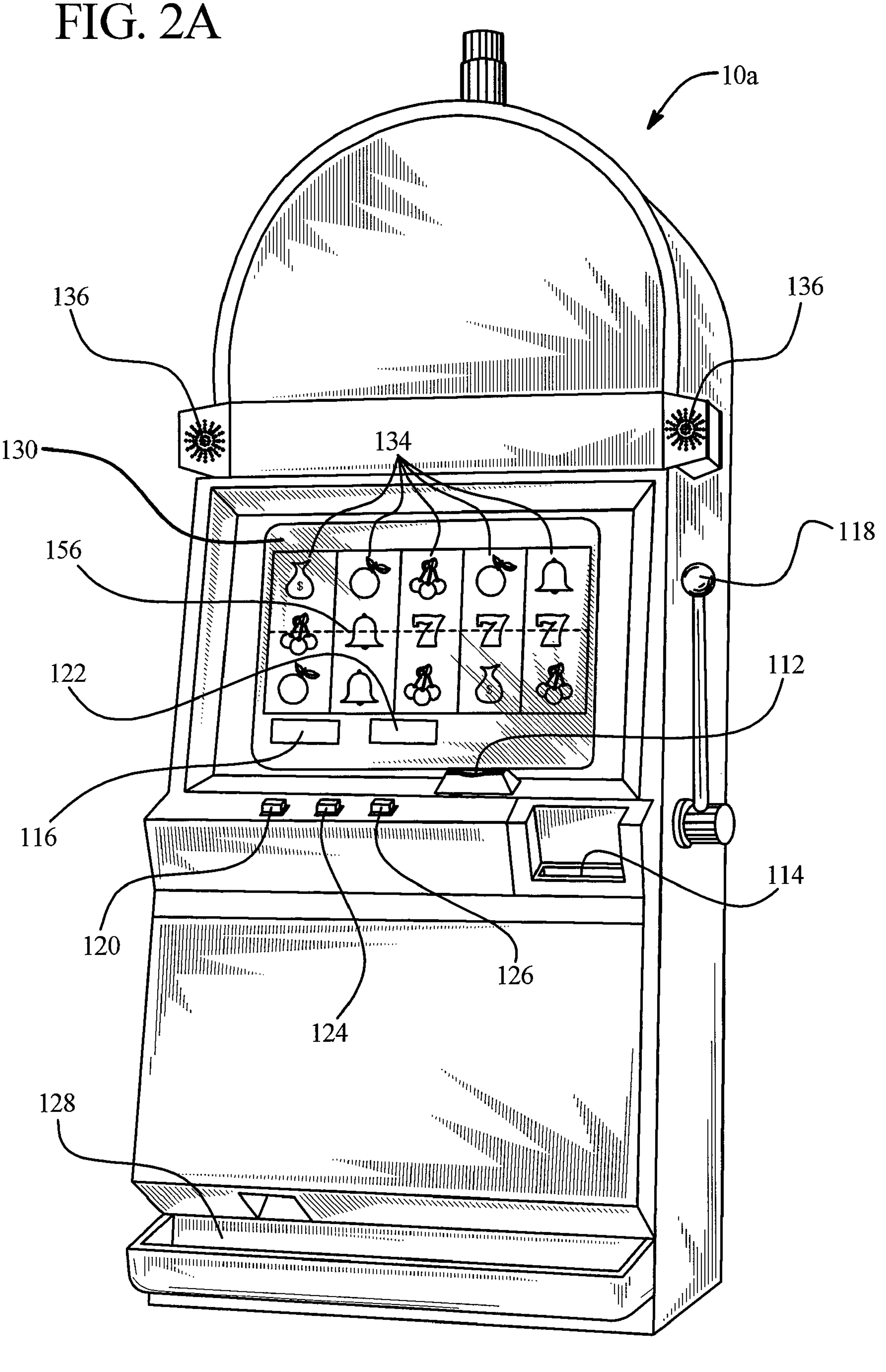
FIGS. 2A and 2B are perspective views of alternative embodiments of the gaming terminal of the present invention.
Figure 2B:
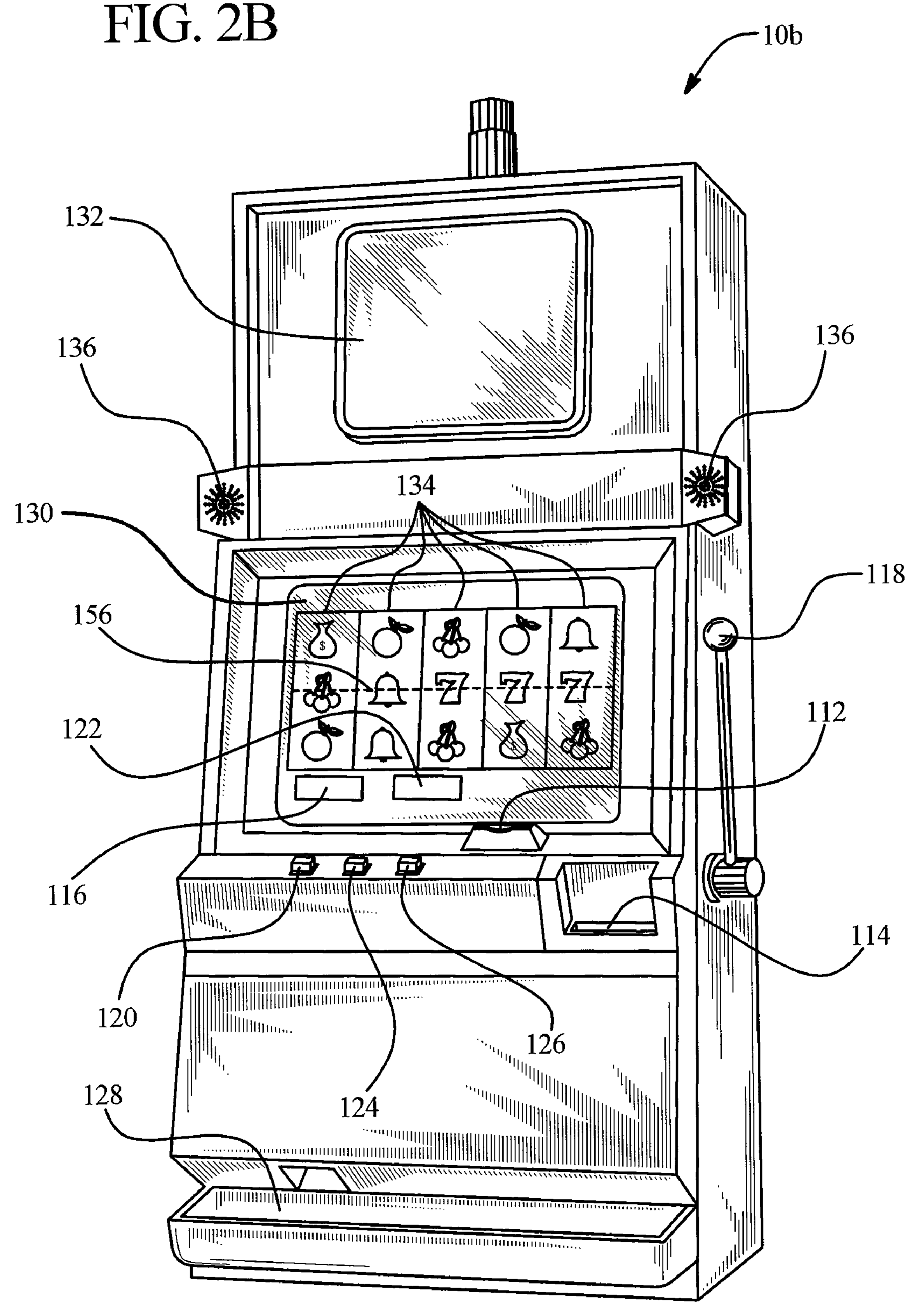

Two embodiments of the gaming terminal or gaming device of the present invention are shown in FIGS. 2A and 2B as gaming terminal 10*a* and gaming terminal 10*b*, respectively. Gaming terminal 10*a* and/or gaming terminal 10*b* are generally referred to herein as gaming terminal 10. Gaming terminal 10 is in one embodiment a slot machine having the controls, displays and features of a conventional slot machine. It is constructed so that a player can operate it while standing or sitting, and gaming terminal 10 is preferably mounted on a console. However, it should be appreciated that gaming terminal 10 can be constructed as a pub-style tabletop game (not shown) which a player can operate preferably while sitting. Furthermore, gaming terminal 10 can be constructed with varying cabinet and display designs, as illustrated by the designs shown in FIGS. 2A and 2B.

As illustrated in FIGS. 2A and 2B, gaming terminal 10 includes a coin slot 112 and bill acceptor 114 where the player inserts money, coins or tokens. The player can place coins in the coin slot 112 or paper money in the bill acceptor 114. Other devices could be used for accepting payment such as readers or validators for credit cards or debit cards. When a player inserts money in gaming terminal 10, a number of credits corresponding to the amount deposited is shown in a credit display 116. After depositing the appropriate amount of money, a player can begin the game by pulling arm 118 or pushing play button 120. Play button 120 can be any play activator used by the player which starts any game or sequence of events in the gaming terminal.

As shown in FIGS. 2A and 2B, gaming terminal 10 also includes a bet display 122 and a bet one button 124. The player places a bet by pushing the bet one button 124. The player can increase the bet by one credit each time the player pushes the bet one button 124. When the player pushes the bet one button 124, the number of credits shown in the credit display 116 decreases by one, and the number of credits shown in the bet display 122 increases by one.

A player may cash out and thereby receive a number of coins corresponding to the number of remaining credits by pushing a cash out button 126. When the player cashes out, the player receives the coins in a coin payout tray 128. The gaming terminal 10 may employ other payout mechanisms such as credit slips redeemable by a cashier or electronically recordable cards which keep track of the player's credits.

Gaming terminal 10 also includes one or more display devices. The embodiment shown in FIG. 2A includes a central display device 130, and the alternative embodiment shown in FIG. 2B includes a central display device 130 as well as an upper display device 132. Gaming terminal 10 displays a plurality of reels 134, such as three to five reels 134 in mechanical or video form at one or more of the display devices. A display device can be any viewing surface such as glass, a video monitor or screen, a liquid crystal display or any other display mechanism. If the reels 134 are in video form, the display device for the video reels 134 is preferably a video monitor. It should be appreciated that the present invention can include one or more paylines displayed in a horizontal and/or diagonal fashion.

Each reel 134 displays a plurality of indicia such as bells, hearts, fruits, numbers, letters, bars or other images which preferably correspond to a theme associated with the gaming terminal 10. The symbols and indicia used on and in gaming terminal 10 may be in mechanical, electronic, electrical or video form. Furthermore, gaming terminal 10 preferably includes speakers 136 for making sounds or playing music.

Figure 3:
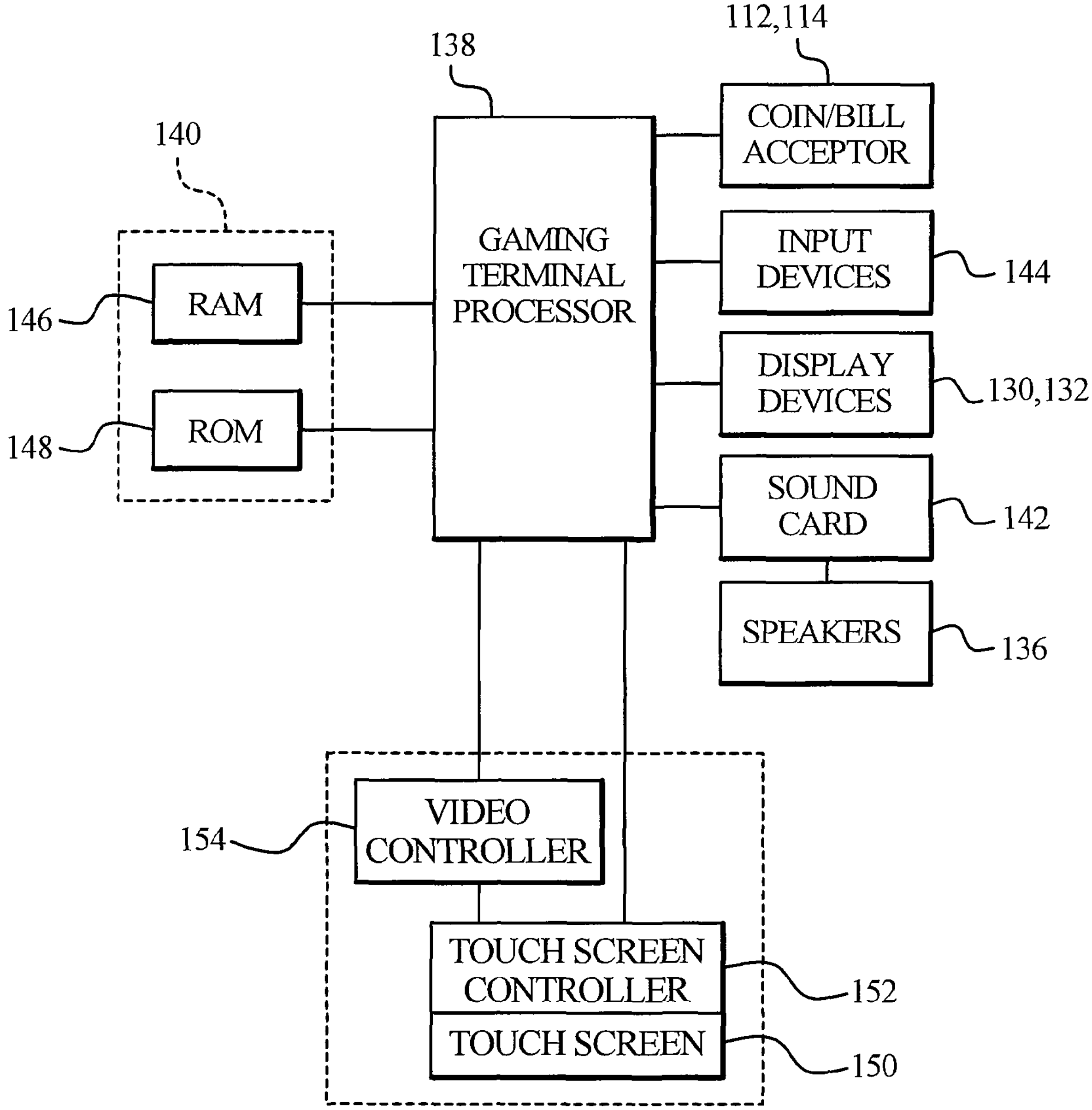
FIG. 3 is a schematic block diagram of an electronic configuration of one embodiment of the gaming terminal of the present invention.

As illustrated in FIG. 3, the general electronic configuration of gaming terminal 10 preferably includes: a processor 138; a memory device 140 for storing program code or other data; a central display device 130; an upper display device 132; a sound card 142; a plurality of speakers 136; and one or more input devices 144. The gaming terminal also includes an external communication device capable of communicating with at least one central controller. The processor 138 is preferably a microprocessor or microcontroller-based platform which is capable of displaying images, symbols and other indicia such as images of people, characters, places, things and faces of cards. The memory device 140 can include random access memory (RAM) 146 for storing event data or other data generated or used during a particular game. The memory device 140 can also include read only memory (ROM) 148 for storing program code which controls the gaming terminal 10 so that it plays a particular game in accordance with applicable game rules and pay tables.

As illustrated in FIG. 3, the player preferably uses the input devices 144, such as pull arm 118, play button 120, the bet one button 124 and the cash out button 126 to input signals into gaming terminal 10. In certain instances it is preferable to use a touch screen 150 and an associated touch screen controller 152 instead of a conventional video monitor display device. Touch screen 150 and touch screen controller 152 are connected to a video controller 154 and processor 138. A player can make decisions and input signals into the gaming terminal 10 by touching touch screen 150 at the appropriate places. As further illustrated in FIG. 3, the processor 138 can be connected to coin slot 112 or bill acceptor 114. The processor 138 can be programmed to require a player to deposit a certain amount of money in order to start the game.

It should be appreciated that although a processor 138 and memory device 140 are preferable implementations of the present invention, the present invention can also be implemented using one or more application-specific integrated circuits (ASIC's) or other hard-wired devices, or using mechanical devices (collectively and/or alternatively referred to herein as a "processor"). Furthermore, although the processor 138 and memory device 140 preferably reside on each gaming terminal 10 unit, it is possible to provide some or all of their functions at a central location such as a network server for communication to a playing station such as over a local area network (LAN), wide area network (WAN), Internet connection, microwave link, and the like.

In addition to winning base game credits, the gaming terminal 10, including any of the base games disclosed above, also includes secondary or bonus games that give players the opportunity to win credits. The gaming terminal 10 preferably employs a video-based display device 130 or 132 for the secondary or bonus games. The secondary or bonus games include a program that automatically begins when the player achieves a qualifying condition or a secondary game triggering outcome in the base game.

In the slot machine embodiment, the qualifying condition or a secondary game triggering outcome includes a particular symbol or symbol combination generated on a display device. As illustrated in the five reel slot game shown in FIGS. 1A and 1B, the qualifying condition or secondary game triggering outcome includes the number seven appearing on three adjacent reels 134 along a payline 156. It should be appreciated that the present invention includes one or more paylines, such as payline 156, wherein the paylines can be horizontal, diagonal or any combination thereof.

Figure 4:
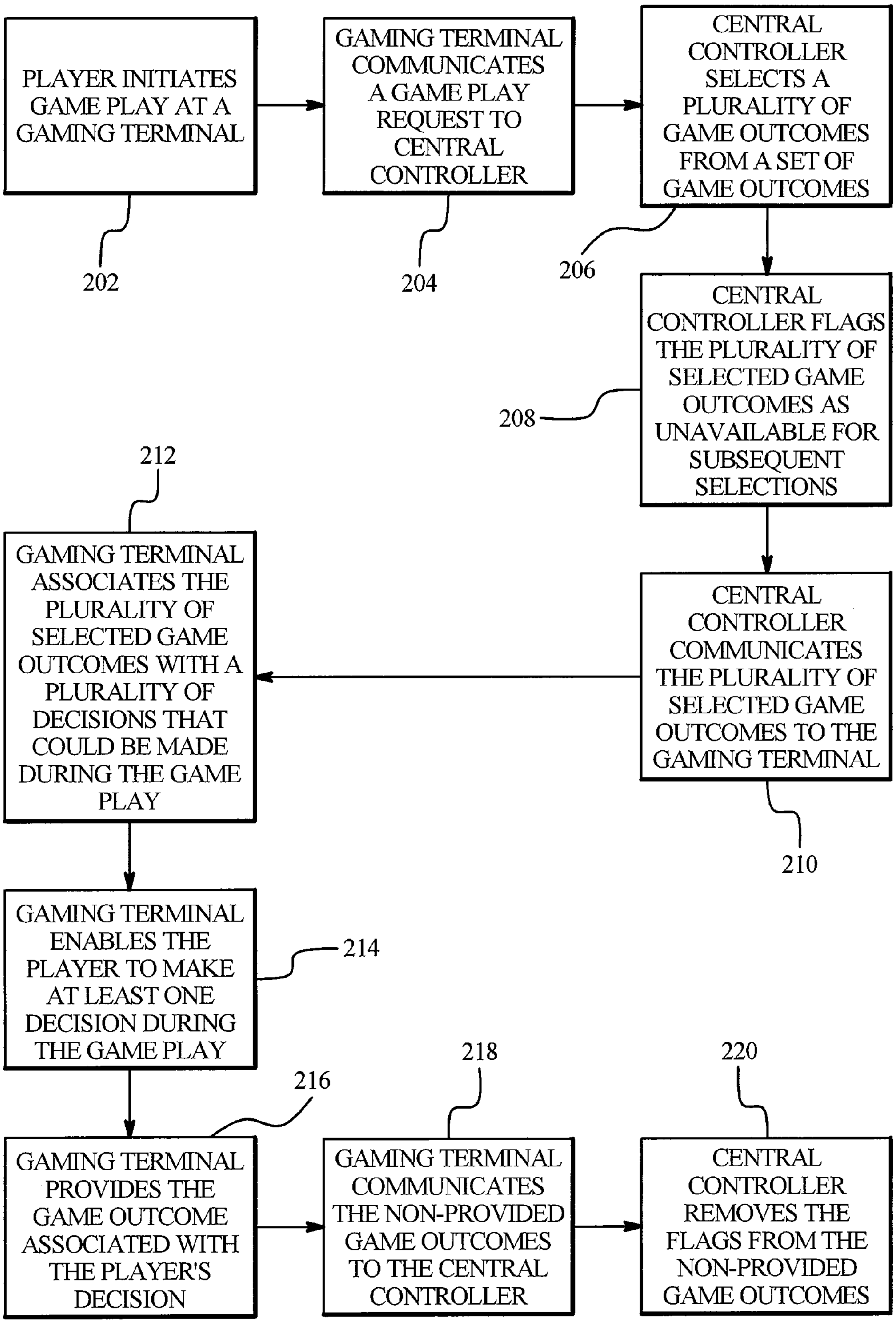
FIG. 4 is a schematic block diagram illustrating one embodiment of the present invention wherein the central controller communicates a plurality of game outcomes to a gaming terminal and the gaming terminal provides one of the game outcomes based on a player's decision.

Referring to FIG. 4, to initiate operation of a primary or base game at one of the plurality of gaming terminals in communication with the central controller, the player must insert the appropriate amount of money or tokens and then pull the arm or push the play button as indicated in block 202. Upon a player initiating a game play, the gaming terminal communicates a game play request to the central controller as indicated in block 204. In an alternative embodiment, the gaming terminal communicates the game play request to the central controller upon the player pulling the arm or pushing the play button. The central controller selects a plurality of game outcomes from a pool or set of predetermined game outcomes as indicated in block 206.

In one embodiment, the number of game outcomes selected is equal to the number of different choices that a player could possibly make during the play of the primary game. That is, each game outcome is associated with a different decision the player may make concerning the play of the game. For example, if the game played on the gaming terminal provides a choice of four different options for the player to decide from, such as four masked selectable selections, then the central controller selects four game outcomes from the pool of game outcomes. In another embodiment, the number of game outcomes selected is less then the number of different choices the player could make during the play of the game. In this embodiment, at least one game outcome will correspond with more than one player choice.

The central controller marks or flags each selected game outcome in the pool as used or unavailable as indicated in block 208. Once a game outcome is marked or flagged it is prevented from a subsequent selection from the pool upon another game play. It should be appreciated that if the pool or set includes more than one of the same game outcome, then only the flagged game outcome cannot be selected upon a subsequent game outcome selection. For example, if a pool or set includes thirty win $5 game outcomes and one is selected and flagged, the flagged win $5 game outcome cannot be selected again but the other twenty-nine non-selected win $5 game outcomes remain available for subsequent game outcome selections. It should be further appreciated that if the mark or flag is removed from a game outcome, the game outcome is no longer used or unavailable and can be subsequently selected from the pool during another game play. The central controller then communicates the selected game outcomes to the requesting gaming terminal as indicated in block 210.

Upon receiving the plurality of selected game outcomes, in one embodiment, the gaming terminal associates each selected game outcome with a different choice or decision the player can make in the primary game as indicated in block 212. For example, if the game provides the player a choice of four masked selections, the gaming terminal associates each selected game outcome with a different masked selection. In another embodiment, each selected game outcome is already associated (by the central controller or other suitable methods) with a different choice or decision the player can make in the game.

The gaming terminal enables the player to make at least one choice or decision regarding the play of the initiated game as indicated in block 214. For example, the gaming terminal enables the player to chose one of the four masked selection. After the player makes at least one choice or decision, the gaming terminal determines which game outcome corresponds with the player's choice or decision. The gaming terminal then provides the player one of the selected game outcomes based on the player's choice or decision as indicated in block 216. That is, the player's choice or decision during the course of game play directly relates to the game outcome ultimately provided to the player. If the game outcome is a win or a lose outcome, the gaming terminal provides the associated value or payout amount, if any, to the player and the game play ends. For example, if the player picked a masked selection that was associated with a selected win $3 game outcome, then the gaming terminal provides the player the associated win $3 game outcome. On the other hand, if the player had selected a different masked selection that was associated with a lose or $0 game outcome, the gaming terminal would provide the player the associated lose or $0 game outcome. If the game outcome is a secondary game trigger, the gaming terminal provides the associated value or payout amount, if any, to the player and then enables the player to play at least one secondary game.

In one embodiment, if the gaming terminal enables the player to play a secondary game (not shown), then regardless of how the game outcome is ultimately provided to the player, either as a value or payout from the primary or base game, as a value or payout from the secondary or bonus game, as a lose from the primary or base game or as a lose from the secondary or bonus game, the game outcome is predetermined. For example, if the particular game outcome associated with the player's choice or decision is a win outcome with an associated value or payout of $10, the outcome may be presented to the player as a $10 win outcome in the primary or base game, a $10 secondary or bonus game win outcome or any combination of payouts in the primary or base game and secondary or bonus game that result in a total payout of $10. Either way, the player is provided $10 and that particular game outcome is removed from the set of game outcomes.

In an alternative embodiment, if the provided game outcome is a bonus or secondary game triggering outcome, the bonus or secondary game proceeds as described above. That is, in the bonus or secondary game, the central controller selects a plurality of game outcomes from a pool of game outcomes (either the same pool used in the primary game or a different pool of game outcomes), flags the selected game outcomes and communicates the selected game outcomes to the gaming terminal. The gaming terminal then proceeds, as described above, with enabling the player to make at least one choice or decision and providing one of the selected game outcomes to the player based on the player's choice or decision.

After the gaming terminal provides the player a game outcome that is based on the player's decision, the gaming terminal communicates to the central controller which game outcome was provided and/or which game outcome(s) were not provided to the player. That is, since the central determination gaming system of the present invention provides all of the game outcomes from the pool of game outcomes over the course of the play cycle and the selected non-provided game outcomes are flagged as unavailable, it is necessary for the gaming terminal to communicate to the central controller which game outcome was provided and/or which game outcome(s) were not used or provided to the player in order for the central controller to insure that the selected non-provided game outcomes are once again available to be subsequently provided to a player.

As seen in FIG. 4, in one embodiment, the gaming terminal communicates each of the remaining non-provided or unused game outcomes back to the central controller as indicated in block 218. In this embodiment, the central controller removes the mark or flag from each non-provided game outcome as indicated in block 220. This enables the non-provided game outcomes to be selected and communicated to a gaming terminal in a subsequent game play. In another embodiment, the gaming terminal communicates to the central controller information or data concerning which game outcome was used or provided to the player. In this embodiment, the gaming terminal removes the mark or flag on each game outcome not provided to the player, thereby enabling the non-provided game outcomes to be selected and communicated to a gaming terminal in a subsequent game play. In another embodiment, the gaming terminal communicates to the central controller information or data concerning which game outcomes was used or provided to the player and which game outcome(s) were not used or not provided to the player.

Figure 5:
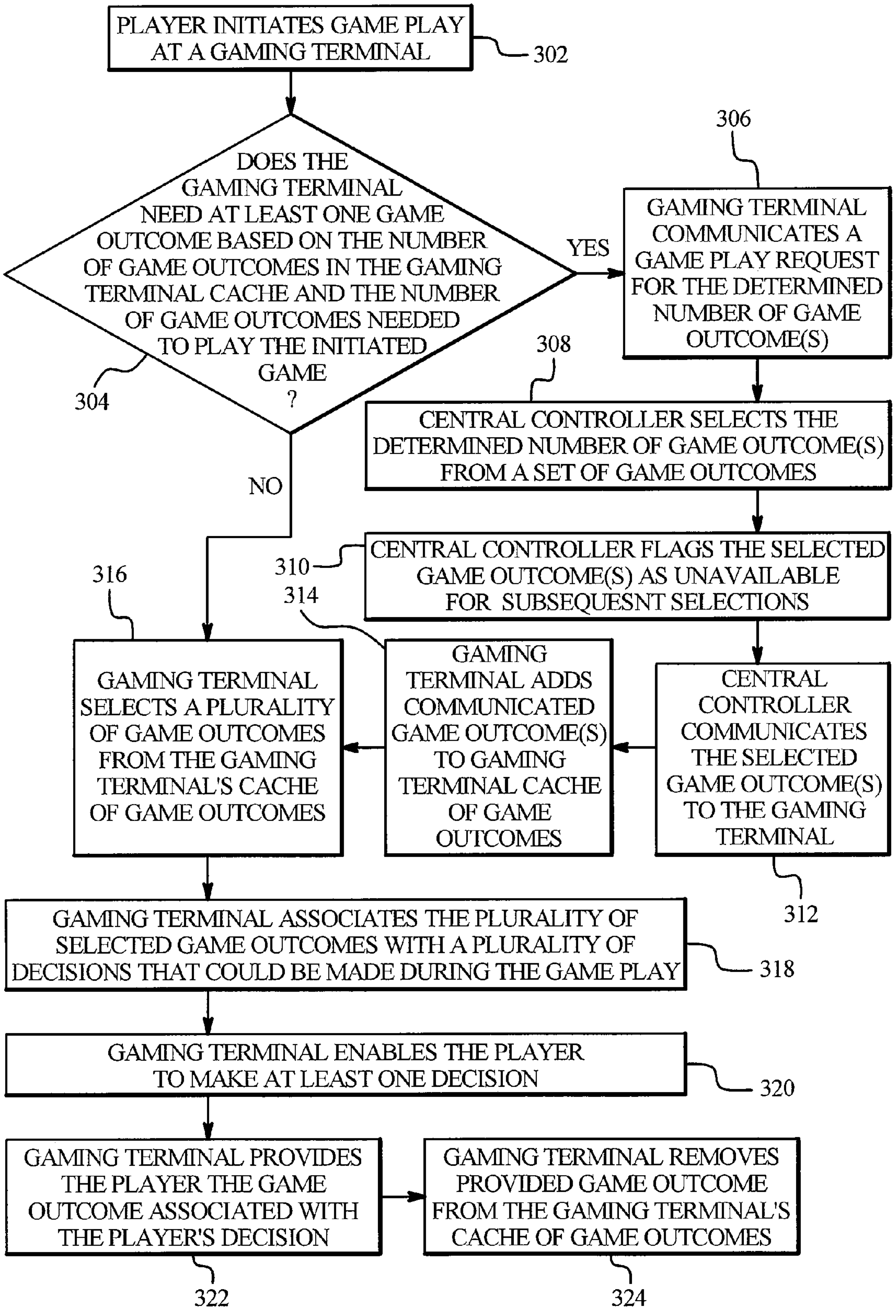
FIG. 5 is a schematic block diagram illustrating an alternative embodiment of the present invention wherein the central controller communicates a plurality of game outcomes to a gaming terminal and the gaming terminal provides one of the game outcomes based on a player's decision.

Referring to FIG. 5, in an alternative embodiment of the present invention, each selected game outcome communicated from the central controller is stored in a cache or memory device of the gaming terminal until it is provided to the player. In this embodiment, a player initiates a game play at a gaming terminal, as indicated in block 302. The gaming terminal then determines if the gaming terminal needs at least one game outcome from the central controller based on the number of game outcomes currently in the gaming terminal cache of game outcomes and the number of game outcomes needed to play the initiated game, as indicated in diamond 304. In one embodiment, even though the gaming terminal may not need any game outcomes for the game initiated by the player, the gaming terminal may request a number of game outcomes to store in the gaming terminal cache. For example, when the number of game outcomes stored in the cache is below a predetermined amount, in order to be ready for an extended amount of play, the gaming terminal may request a number of game outcomes to store for later use.

If the gaming terminal needs at least one game outcome, the gaming terminal communicates a game play request to the central controller as indicated in block 306. The game play request includes the determined number of game outcome(s) needed.

As described above, the central controller selects the requested number of game outcome(s), flags the selected game outcome(s) and communicates the selected game outcome(s) to the gaming terminal as indicated in blocks 308, 310 and 312, respectively.

The gaming terminal adds the communicated game outcome(s) to the gaming terminal cache of game outcomes as indicated in block 314. The gaming terminal then selects a plurality of game outcomes from the cache of game outcomes as indicated in block 316. In this embodiment, the gaming terminal associates the plurality of selected game outcomes with a plurality of decisions that could be made during the game play, enables the player to make at least one decision and provides the player with the game outcome associated with the player's decision as indicated in blocks 318, 320 and 322, respectively. The gaming terminal then removes the provided game outcome from the cache of game outcomes as indicated in block 324. It should be appreciated that the gaming terminal retains the non-provided game outcomes in the cache and does not communicate the unused or non-provided game outcomes to the central controller. That is, upon a player initiating a subsequent game at the gaming terminal, if needed, the central controller communicates a new game outcome to the gaming terminal to replace only the game outcome provided during the previous game.

If the gaming terminal does not need at least one game outcome (i.e., the cache or memory device already contains enough game outcomes to be associated with the plurality of decisions that could be made during game play), the gaming terminal selects a plurality of game outcomes from the cache of game outcomes as indicated in block 316 and proceeds as described above.

In one embodiment illustrating the present invention in a slot machine gaming terminal, upon a player initiating a game play, the reels begin to spin. While the reels are spinning (or alternatively, upon the player initiating the game play), the central controller selects a plurality of game outcomes, flags the plurality of selected game outcomes as unavailable and communicates the plurality of selected game outcomes to the gaming terminal as described above. It should be appreciated that in this embodiment, each game outcome in the pool of game outcomes has an associated presentation component. That is, each game outcome is associated with a specific reel symbol combination to be displayed or presented to the player if that game outcome is provided to the player.

Upon receiving the plurality of selected game outcomes, the gaming terminal associates each received game outcome with a different choice or decision the player could possibly make during the play of the slot game. The gaming terminal then enables the player to make at least one choice or decision concerning the play of the slot game. For example, the choice or decision could be enabling the player to decide when to stop the reels from spinning, wherein when the player decides to stop the reels is associated with one of the selected game outcomes. It should be appreciated that the gaming terminal or central controller is operable to associate the plurality of selected game outcomes with any other suitable plurality of choices or decisions the player could make concerning the play of the slot game.

After the player has made at least one choice or decision regarding the play of the slot game, the gaming terminal provides the player with the selected game outcome associated with the player's choice or decision. For example, if the gaming terminal had associated a win $2 game outcome with the player's choice or decision to stop the reels after spinning for between 1.5 and 2.0 seconds and the player decided to stop the reels after 1.8 seconds, then the gaming terminal would provide the player the associated win $2 game outcome and display the appropriate presentation of reel symbol combinations for the provided game outcome. The gaming terminal then communicates to the central controller which selected game outcome was provided/not provided in order for the central controller to remove the flag from the non-provided selected game outcomes as described above.

Figure 6:
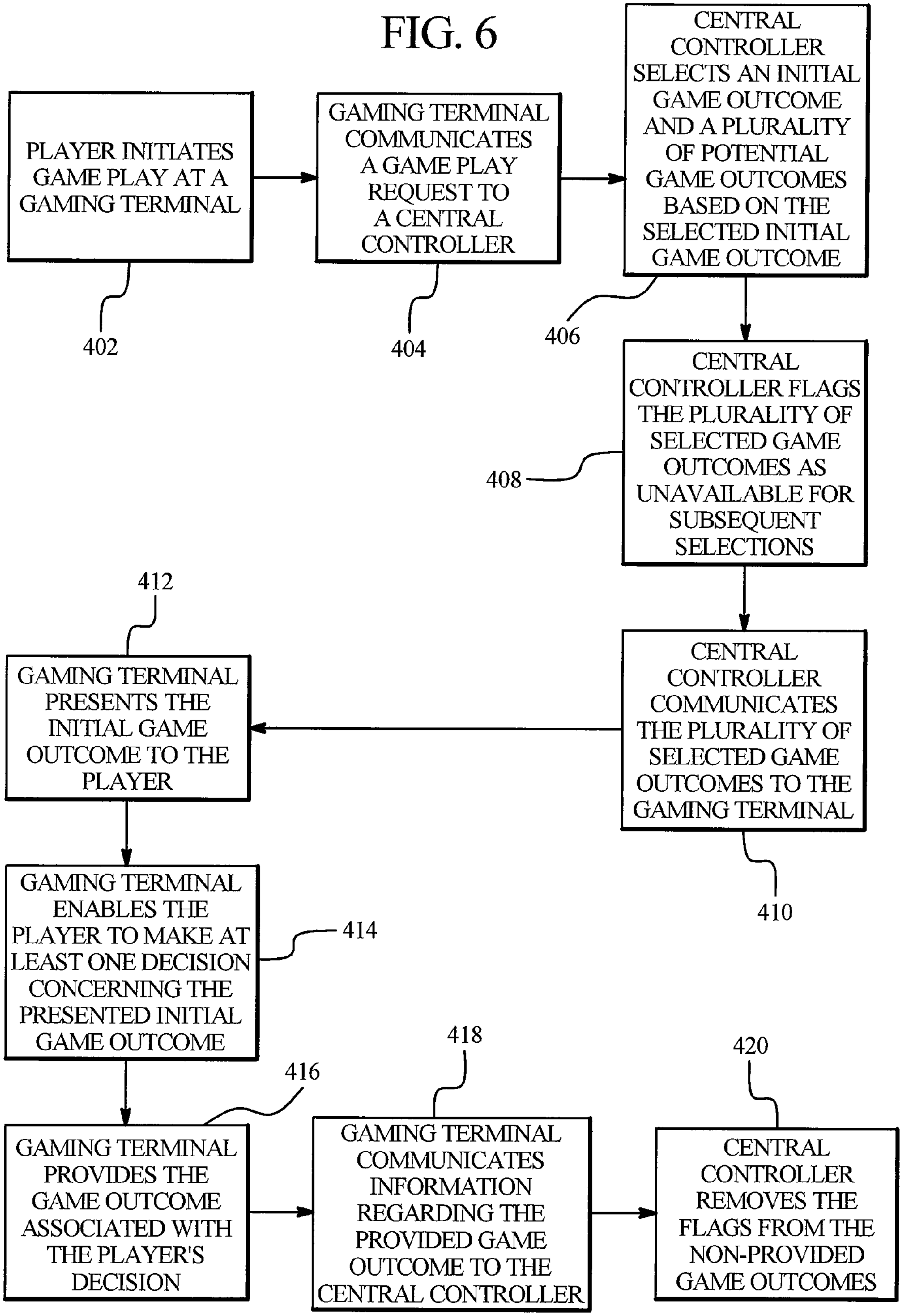
FIG. 6 is a schematic block diagram illustrating one embodiment of the present invention wherein the central controller communicates an initial game outcome and a plurality of related potential game outcomes to a gaming terminal and the gaming terminal provides one of the game outcomes based on a player's decision.

FIG. 6 illustrates an alternative embodiment of the present invention wherein the gaming terminal offers or provides the player an initial game outcome and enables the player to make at least one choice or decision that may modify the initial game outcome. In this embodiment, a player initiates a game play at a gaming terminal as indicated in block 402. The gaming terminal communicates a game play request to the central controller as indicated in block 404. The central controller then selects an initial game outcome and a plurality of potential game outcomes based on the selected initial game outcome from a set or pool of game outcomes as indicated in block 406. That is, the central controller selects one game outcome from the pool of game outcomes and designates the selected game outcome as an initial game outcome. The initial game outcome represents the game outcome that the player will base his choice(s) or decision(s) on. For example, the initial outcome may be the initial hand of cards dealt to the player. The central controller then selects a plurality of potential game outcome that could be obtained based on the choice (s) or decision(s) the player makes in respect to the initial game outcome. A plurality of the potential game outcomes are associated with or related to the plurality of choices or decisions the player can possibly make during the play of the game based on the initial outcome.

After selecting the initial game outcome and the plurality of potential game outcomes, the central controller flags each selected game outcome and communicates each selected game outcome to the gaming terminal as described above and indicated in blocks 408 and 410.

The gaming terminal offers the player the designated initial game outcome as indicated in block 412. The gaming terminal then enables the player to make at least one choice or decision regarding the play of the initial game outcome as indicated in block 414. The gaming terminal provides the player with the game outcome associated with the player's decision as indicated in block 416. That is, the player's choice or decision directly determines the game outcome that will be provided to the player. It should be appreciated that if the player is satisfied with the offered initial game outcome, then the player is provided the initial game outcome and not one of the plurality of potential game outcomes. In this case, the game outcome provided to the player (the initial game outcome) is still based on the player's choice or decision (the decision to accept the initial game outcome).

After providing a game outcome based on the player's choice or decision, the gaming terminal communicates information regarding the provided game outcome to the central controller as indicated in block 418. The central controller utilizes this communicated information to determine which game outcomes were provided and/or which game outcomes were not provided during the game play. The central controller then removes the flags from the non-provided game outcomes as indicated in block 420. As described above, this enables the non-provided game outcomes to be selected and communicated to a gaming terminal in a subsequent game play.

In one embodiment illustrating a five card poker style gaming terminal, the central controller selects a game outcome from the pool or set of game outcomes as the initial game outcome and then selects thirty-one game outcomes from the pool or set as potential game outcomes. The thirty-one potential game outcomes are the thirty-one different choices that can be obtained from the initial game outcome based on the player's decision to discard at least one card in the poker game. A plurality of the potential game outcomes are related to the initial game outcome. That is, a plurality of the potential game outcomes are selected based on their association with the initial game outcome. For instance, one selected potential game outcome may be a win $2 game outcome that the player obtains if the player holds the first, third and fifth card and discards the second and fourth cards for new cards, while another selected potential game outcome may be a lose or $0 game outcome that the player obtains if the player holds the second, third and fourth card and discards the first and fifth card for new cards. The initial game outcome is associated with the game outcome that will be obtained if the player is satisfied with the initial game outcome and decides to hold each card. That is, the thirty-one potential game outcomes coupled with the initial game outcome represent the thirty-two different game outcomes that can possibly be obtained based on the player's decision of how to play the five cards that are initially dealt.

It should be appreciated that the game presentation component of a plurality of the potential game outcomes are each related to the game outcome presentation of the initial game outcome. That is, the game presentation component for the potential game outcome associated with the player holding the second, third and fourth cards of the initial game outcome (i.e., the initial poker hand), will include the same second, third and fourth cards as the game presentation component of the initial game outcome.

In this embodiment, the central controller flags the plurality of selected game outcomes (the initial game outcome and the plurality of potential game outcomes) and communicates the plurality of selected game outcomes to the central controller as described above.

Upon receiving the selected game outcomes, the gaming terminal offers the initial game outcome to the player (i.e., displays five cards in a poker style game). The gaming terminal then enables the player to make at least one and preferable a plurality of choices regarding the initial game outcome presented to the player. For example, the gaming terminal enables the player to hold or discard each presented card. Depending on the player's choice concerning the play of the game, (i.e., which cards the player choose to hold or discard), the gaming terminal selects the potential game outcome that is associated with the choice or decision the player made. The gaming terminal provides the player the game outcome associated with the player's choice or decision. For example, if the player choose to discard the fourth and fifth cards, then the gaming terminal would provide the player a win $1 game outcome that is associated with the player discarding the fourth and fifth cards. If the player's choice is not to discard any cards but to hold each of the cards initially dealt, then the initial game outcome is provided to the player. It should be appreciated that the presentation of the provided game outcome may be similar to the presentation of the initial game outcome. That is, if the player decided to hold the first, second and third cards and discard the fourth and fifth cards, then the provided game outcome will be presented to the player with the same first, second and third cards as the initial game outcome.

After the gaming terminal provides the player a game outcome that is based on the player's decision, the gaming terminal communicates which game outcome was provided to the central controller, as described above, to enable the non-provided game outcomes to be reselected and communicated to a gaming terminal in a subsequent game play.

In an alternative embodiment of the present invention (not shown), the central controller maintains at least one set or pool of game outcome seeds. Each game outcome seed is a unique random number seed which is deterministic of a game outcome, such as a win outcome, a lose outcome or a secondary or bonus game triggering outcome. In this embodiment, as described above, the central controller selects a plurality of game outcome seeds from the set or pool of game outcome seeds. The central controller flags the selected game outcome seeds as unavailable and communicates the selected game outcome seeds to the gaming terminal.

The gaming terminal utilizes the selected game outcome seed in a random number generating algorithm to generate at least one and preferably a plurality of random numbers. The gaming terminal uses the generated random numbers to determine the game outcome that the seed is deterministic of. The gaming terminal then associates the determined game outcomes with the choices or decisions available to the player in the game and proceeds as described above.

It should be appreciated that in this embodiment, if any one or more than one designated gaming terminals configured for playing a certain game receive the same specific game outcome seed, the resulting random numbers generated (and thus the resulting game outcomes) will always be the same even though the different gaming terminals operate independently from one another. That is, if a plurality of the same gaming terminals each run the same game outcome seed through a predefined random number generating algorithm, each of such same gaming terminals will generate the same series of random numbers that correspond to the same game outcomes.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a central controller programmed to:

(a) generate a plurality of game outcomes, wherein at least two of said game outcomes are different and each generated game outcome is either a losing gaming outcome associated with a value of zero or one of a plurality of different winning game outcomes, each different winning game outcome associated with one of a plurality of different values greater than zero; and (b) output a plurality of signals, each signal representing the value associated with one of the plurality of generated game outcomes;

a plurality of gaming devices remote from the central controller and configured to operate with the central controller, each gaming device including:

(i) at least one display device, (ii) at least one input device, and (iii) at least one processor programmed to operate with said at least one display device and said at least one input device to:

(a) receive said outputted signals representing the values associated with the plurality of generated game outcomes, (b) after an initiation of a play of a game including a designated quantity of at least two choices, enable a selection of at least one of said choices in the play of the game, and (c) provide one of the values associated with one of said generated game outcomes to a player, wherein said provided value is based on the at least one selected choice in the play of the game and said values associated with said generated game outcomes not provided to the player in the play of the game are stored to be subsequently provided for at least one subsequent play of at least one game including at least the designated quantity of choices.

2. The gaming system of claim 1, wherein said values associated with said generated game outcomes not provided to the player in the play of the game are stored in a memory device of said gaming device which received said outputted signals representing the values associated with the plurality of generated game outcomes.

3. The gaming system of claim 1, wherein said values associated with said generated game outcomes not provided to the player in the play of the game are stored in a memory device of the central controller.

4. The gaming system of claim 1, wherein said at least one processor of at least one of said gaming devices is programmed to: enable a selection of a plurality of said choices in the play of the game and provide one of said values associated with one of said generated game outcomes to the player, wherein said provided value is based on said plurality of selected choices in the play of the game.

5. The gaming system of claim 1, wherein the plurality of generated game outcomes includes an initial game outcome and a plurality of potential game outcomes whereby the potential game outcomes are selected based on the initial game outcome.

6. The gaming system of claim 5, wherein said at least one processor of at least one of said gaming devices is programmed to: display said initial game outcome to the player and enable a selection of at least one choice based on the displayed initial game outcome.

7. The gaming system of claim 1, wherein said game is a wagering game.

8. The gaming system of claim 1, wherein at least one of said generated game outcomes includes a presentation component.

9. A gaming device operable under control of at least one processor, said gaming device comprising:

at least one display device configured to operate with said at least one processor; and at least one input device configured to operate with said at least one processor;

said at least one processor programmed to:

(a) receive a plurality of signals, each signal representing a value associated with one of a plurality of generated game outcomes, wherein at least two of said generated game outcomes are different and each generated game outcome is either a losing gaming outcome associated with a value of zero or one of a plurality of different winning game outcomes, each different winning game outcome associated with one of a plurality of different values greater than zero; and (b) after an initiation of a play of a game including a designated quantity of at least two choices, control the play of the game by:

(i) enabling a selection of at least one of said choices in the play of the game, and (ii) providing one of said values associated with one of said generated game outcomes to a player, wherein said provided value is based on the at least one selected choice in the play of the game and said values associated with said generated game outcomes not provided to the player in the play of the game are stored to be subsequently provided for at least one subsequent play of at least game including at least the designated quantity of choices.

10. The gaming device of claim 9, wherein said plurality of signals representing said values associated with said plurality of generated game outcomes are outputted from a remote central controller.

11. The gaming device of claim 9, wherein said values associated with said generated game outcomes not provided to the player in the play of the game are stored in a memory device of said gaming device.

12. The gaming device of claim 9, wherein said values associated with said generated game outcomes not provided to the player in the play of the game are stored in a memory device of a remote central controller.

13. The gaming device of claim 9, wherein said at least one processor is programmed to control the play of the game by enabling a selection of a plurality of said choices in the play of the game and providing one of said values associated with one of said generated game outcomes to the player, wherein said provided value is based on said plurality of selected choices in the play of the game.

14. The gaming device of claim 9, wherein the plurality of generated game outcomes includes an initial game outcome and a plurality of potential game outcomes whereby the potential game outcomes are selected based on the initial game outcome.

15. The gaming device of claim 14, wherein said at least one processor is programmed to control the play of the game by displaying said initial game outcome to the player and enabling a selection of at least one choice based on the displayed initial game outcome.

16. The gaming device of claim 9, wherein said game is a wagering game.

17. The gaming device of claim 9, wherein at least one of said generated game outcomes includes a presentation component.

18. A gaming system comprising:

a plurality of gaming devices, each gaming device including:

(i) at least one display device, and (ii) at least one input device, and a central controller remote from said plurality of gaming devices and configured to communicate with said plurality of gaming devices, said central controller programmed to:

(a) generate a plurality of game outcomes, wherein at least two of said game outcomes are different and each generated game outcome is either a losing gaming outcome associated with a value of zero or one of a plurality of different winning game outcomes, each different winning game outcome associated with one of a plurality of different values greater than zero;

(b) output a plurality of signals, each signal representing the value associated with one of the plurality of generated game outcomes;

(c) cause at least one of said gaming devices to:

(i) receive said outputted signals representing the values associated with the plurality of generated game outcomes, (ii) after an initiation of a play of a game including a designated quantity of at least two choices, enable a selection of at least one of said plurality of choices in the play of the game, and (iii) provide one of said values associated with one of said generated game outcomes to a player, wherein said provided value is based on the at least one selected choice in the play of the game; and (d) cause said values associated with said generated game outcomes not provided to the player in the play of the game to be stored to be subsequently provided for at least one subsequent play of at least one game including at least the designated quantity of choices.

19. The gaming system of claim 18, wherein each gaming device includes at least one processor configured to operate with said at least one display device and said at least one input device.

20. A method of operating a gaming system including a plurality of instructions, said method comprising:

(a) causing a central controller to execute at least one of the instructions to:

(i) generate a plurality of game outcomes, wherein at least two of said game outcomes are different and each generated game outcome is either a losing gaming outcome associated with a value of zero or one of a plurality of different winning game outcomes, each different winning game outcome associated with one of a plurality of different values greater than zero; and (ii) output a plurality of signals, each signal representing the value associated with one of the plurality of generated game outcomes;

(b) causing at least one of a plurality of gaming devices remote from the central controller to:

(i) receive said outputted signals representing the values associated with the plurality of generated game outcomes;

(ii) after an initiation of a play of a game including a designated quantity of at least two choices, enable a selection of at least one of the plurality choices in the play of the game; and (iii) provide one of said values associated with one of said generated game outcomes to a player, wherein said provided value is based on the at least one selected choice in the play of the game; and (c) causing said values associated with said generated game outcomes not provided to the player in the play of the game to be stored to be subsequently provided for at least one subsequent play of at least one game including at least the designated quantity of choices.

21. The method of claim 20, which includes causing at least one processor of said gaming device which received said outputted signals representing the values associated with the plurality of generated game outcomes to execute at least one of the instructions to store said values associated with said generated game outcomes not provided to the player in the play of the game.

22. The method of claim 20, which includes causing the central controller to execute at least one of the instructions to store said values associated with said generated game outcomes not provided to the player in the play of the game.

23. The method of claim 20, which includes causing said at least one of said gaming device which received said outputted signals representing the values associated with the plurality of generated game outcomes to: enable a selection of a plurality of said choices in the play of the game and provide one of said values associated with one of said generated game outcomes to the player, wherein said provided value is based on said plurality of selected choices in the play of the game.

24. The method of claim 20, wherein the plurality of generated game outcomes includes an initial game outcome and a plurality of potential game outcomes whereby the potential game outcomes are selected based on the initial game outcome.

25. The method of claim 24, which includes: (i) causing at least one display device of said at least one gaming device which received said outputted signals representing the values associated with the plurality of generated game outcomes to display said initial game outcome and (ii) enabling a selection of at least one choice based on the displayed initial game outcome.

26. The method of claim 20, wherein said game is a wagering game.

27. The method of claim 20, wherein at least one of said generated game outcomes includes a presentation component.

28. The method of claim 20, which is provided through a data network.

29. The method of claim 28, wherein the data network is an internet.

30. A method of operating a gaming device including a plurality of instructions, said method comprising:

(a) receiving a plurality of signals, each signal representing a value associated with one of a plurality of generated game outcomes, wherein at least two of said generated game outcomes are different and each generated game outcome is either a losing gaming outcome associated with a value of zero or one of a plurality of different winning game outcomes, each different winning game outcome associated with one of a plurality of different values greater than zero;

(b) after an initiation of a play of a game including a designated quantity of at least two choices, enabling a selection of at least one of the plurality of choices in the play of the game;

(c) providing one of said values associated with one of said generated game outcomes to a player, wherein said provided value is based on the at least one selected choice in the play of the game; and (d) causing at least one processor to execute the plurality of instructions to cause said values associated with said generated game outcomes not provided to the player in the play of the game to be stored to be subsequently provided for at least one subsequent play of at least one game including at least the designated quantity of choices.

31. The method of claim 30, which includes receiving a plurality of signals representing said values associated with said plurality of generated game outcomes from a remote central controller.

32. The method of claim 30, which includes causing the at least one processor to execute the plurality of instructions to store said values associated with said generated game outcomes not provided to the player in the play of the game.

33. The method of claim 30, which includes causing a remote central controller to store said values associated with said generated game outcomes not provided to the player in the play of the game.

34. The method of claim 30, which includes enabling a selection of a plurality of said choices in the play of the game and providing one of the values associated with one of said generated game outcomes to the player, wherein said provided value is based on said plurality of selected choices in the play of the game.

35. The method of claim 30, wherein the plurality of generated game outcomes includes an initial game outcome and a plurality of potential game outcomes whereby the potential game outcomes are selected based on the initial game outcome.

36. The method of claim 35, which includes: (i) causing at least one display device to display said initial game outcome and (ii) enabling a selection of at least one choice based on the displayed initial game outcome.

37. The method of claim 30, wherein said game is a wagering game.

38. The method of claim 30, wherein at least one of said generated game outcomes includes a presentation component.

39. The method of claim 30, which is provided through a data network.

40. The method of claim 39, wherein the data network is an internet.

41. A method of operating a gaming system including a plurality of instructions, said method comprising:

(a) causing at least one of the instructions to be executed to generate a plurality of game outcomes, wherein at least two of said game outcomes are different and each generated game outcome is either a losing gaming outcome associated with a value of zero or one of a plurality of different winning game outcomes, each different winning game outcome associated with one of a plurality of different values greater than zero;

(b) causing at least one of the instructions to be executed to output a plurality of signals, each signal representing the value associated with one of the plurality of generated game outcomes;

(c) causing at least one gaming device to:

(i) receive said outputted signals representing the values associated with the plurality of generated game outcomes, (ii) after an initiation of a play of a game including a designated quantity of at least two choices, enable a selection of at least one of said plurality of choices in the play of the game, and (iii) provide one of said values associated with one of said generated game outcomes to a player, wherein said provided value is based on the at least one selected choice in the play of the game; and (d) causing said values associated with said generated game outcomes not provided to the player in the play of the game to be stored to be subsequently provided for at least one subsequent play of at least one game including at least the designated quantity of choices.

42. The method of claim 41, which is provided through a data network.

43. The method of claim 42, wherein the data network is an internet.

* * * * *